(12) United States Patent
Khan et al.

(10) Patent No.: US 10,929,915 B2
(45) Date of Patent: Feb. 23, 2021

(54) METHOD AND SYSTEM FOR MULTI-MODAL INPUT BASED PLATFORM FOR INTENT BASED PRODUCT RECOMMENDATIONS

(71) Applicant: WIPRO LIMITED, Bangalore (IN)

(72) Inventors: Ghulam Mohiuddin Khan, Bangalore (IN); Gopichand Agnihotram, Bangalore (IN)

(73) Assignee: Wipro Limited, Bangalore (IN)

( * ) Notice: Subject to any disclaimer, the term of this patent is extended or adjusted under 35 U.S.C. 154(b) by 140 days.

(21) Appl. No.: 16/196,033

(22) Filed: Nov. 20, 2018

(65) Prior Publication Data

US 2020/0104900 A1    Apr. 2, 2020

(30) Foreign Application Priority Data

Sep. 29, 2018 (IN) .............................. 201841036901

(51) Int. Cl.

| | |
|---|---|
| *G10L 15/22* | (2006.01) |
| *G06Q 30/06* | (2012.01) |
| *G06F 3/01* | (2006.01) |
| *G10L 15/16* | (2006.01) |
| *G10L 15/18* | (2013.01) |

(52) U.S. Cl.
CPC ......... *G06Q 30/0631* (2013.01); *G06F 3/013* (2013.01); *G06F 3/017* (2013.01); *G10L 15/16* (2013.01); *G10L 15/1815* (2013.01); *G10L 15/22* (2013.01)

(58) Field of Classification Search
CPC ..... G10L 15/16; G10L 15/1815; G10L 15/22; G06F 3/013; G06F 3/017; G06Q 30/0631
See application file for complete search history.

(56) References Cited

U.S. PATENT DOCUMENTS

| | | |
|---|---|---|
| 8,798,995 B1 | 8/2014 | Edara |
| 2013/0129210 A1 | 5/2013 | Na |

(Continued)

OTHER PUBLICATIONS

Hao et al.; Proposal of interactive service for service robot; CAAI Trans. Intell. Technol., 2017, vol. 2, Iss. 4, pp. 148-153 (Year: 2017).*

(Continued)

*Primary Examiner* — Abul K Azad
(74) *Attorney, Agent, or Firm* — Finnegan, Henderson, Farabow, Garrett & Dunner, LLP

(57) ABSTRACT

A method and a system are described for multi-modal input based platform for intent based product recommendations. The method comprises receiving, by the product recommendation device, one or more multi-modal user inputs associated with a first product, wherein the one or more multi-modal user inputs are at least speech, text, bodily expressions and clickstream data. It further includes determining an intent-score for each of the one or more multi-modal user inputs using one or more trained data models. It further includes computing an emotion-score by aggregating the intent-score for each of the one or more multi-modal user inputs based on a weighted average of the intent-score for each of the one or more multi-modal user inputs and the method then includes recommending one or more second products based on the emotion-score.

10 Claims, 4 Drawing Sheets

(56) References Cited

U.S. PATENT DOCUMENTS

2014/0298364 A1    10/2014  Stephanov et al.
2018/0349688 A1*   12/2018  Barari ............... G06K 9/00718

OTHER PUBLICATIONS

Chen et al.; International Journal of social robotics, 7, 709-729 (2015); pp. 1-56 (Year: 2015).*
Barros, P., et al., "Multimodal emotional state recognition using sequence-dependent deep hierarchical features", Science Direct (2015), pp. 1-38.

* cited by examiner

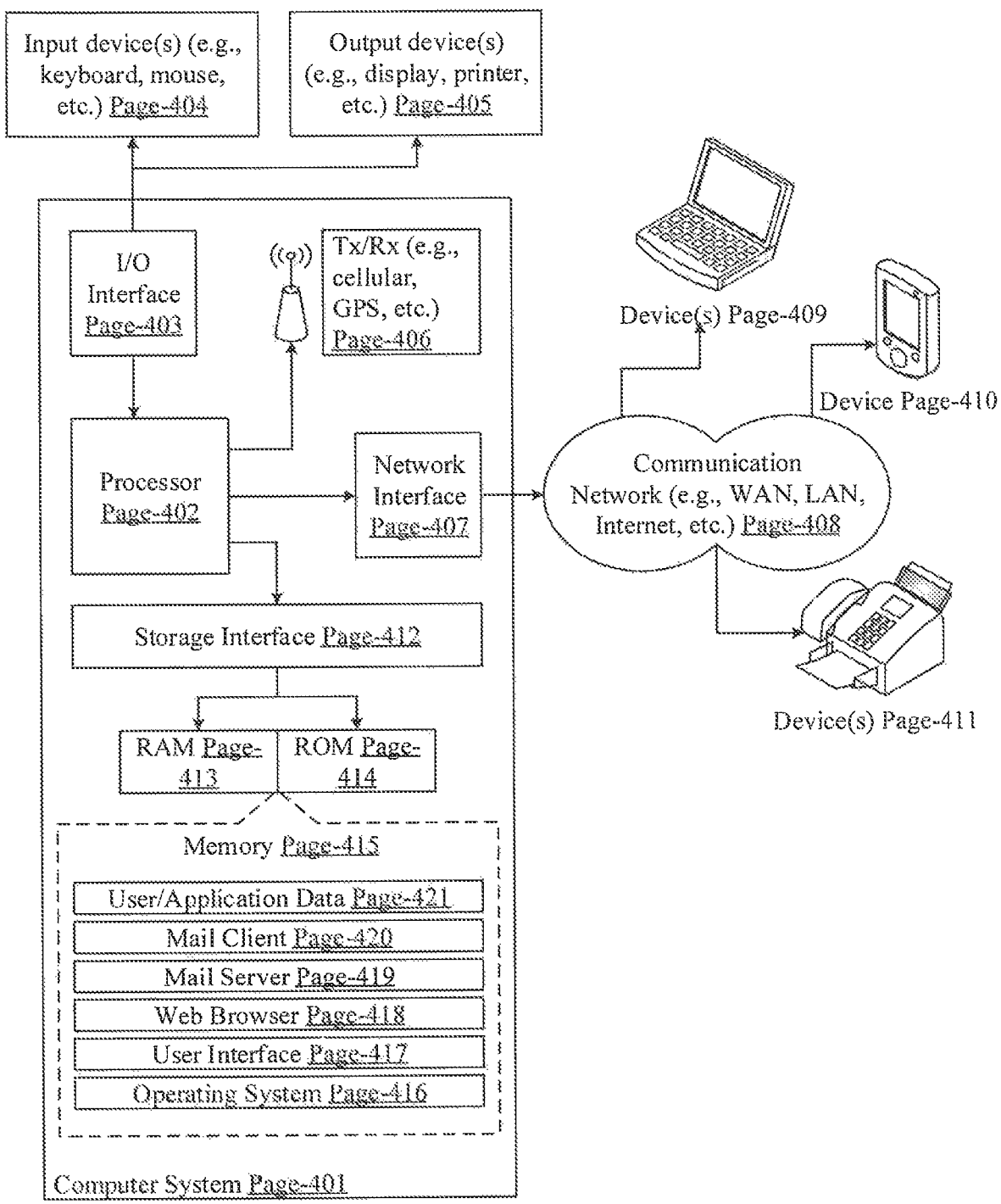
FIG. 4 Example Computer System

METHOD AND SYSTEM FOR MULTI-MODAL INPUT BASED PLATFORM FOR INTENT BASED PRODUCT RECOMMENDATIONS

TECHNICAL FIELD

The present subject matter is related, in general, to product recommendation and more specifically, but not exclusively, to a method and a system for multi-modal input fusion based machine learning platform for intent based product recommendations.

BACKGROUND

In recent years, e-commerce has changed the market dynamics of buying and selling of products and services and hence retaining the customer base. People have started using the Business to Consumer (B2C) model to sell and buy their products using Internet. In this process, Human-Machine Interaction (HMI) has been gaining momentum. HMI has the potential to do away with recommending on-line products to consumers just based on clickstreams, and based on one or more user inputs like text, or facial emotion. The current systems in the e-commerce market recommend products based on consumer's usage and clickstream history, previously viewed products and products purchased in the past. The existing systems only take care of textual or voice conversation while interacting with the machines and recommending products which are available online. In e-commerce, these chat bots mainly address the text-based user utterances and bot identifies and recommends the products in the internet and provides the product related information to the user who wants to buy/sell it. However, there are no systems which can track and interpret various user emotions while recommending a product or while the user is looking to purchase a product.

The information disclosed in this background of the disclosure section is only for enhancement of understanding of the general background of the invention and should not be taken as an acknowledgement or any form of suggestion that this information forms the prior art already known to a person skilled in the art.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

According to embodiments illustrated herein, there may be provided a method of multi-modal input fusion based for intent based product recommendations. The method includes receiving, by a product recommendation device, one or more multi-modal user inputs associated with a first product, wherein the one or more multi-modal user inputs are at least speech, text, bodily expressions and clickstream data. It includes determining an intent-score for each of the one or more multi-modal user inputs using one or more trained data models. It further includes computing an emotion-score by aggregating the intent-score for each of the one or more multi-modal user inputs based on a weighted average of the intent-score for each of the one or more multi-modal user inputs; and the method finally recommends one or more second products based on the emotion-score.

According to embodiments illustrated herein, there may be provided a system for multi-modal input fusion based for intent based product recommendations. The system includes a processor and a memory communicatively coupled to the processor, wherein the memory stores processor executable instructions, which on execution causes the processor to receive one or more multi-modal user inputs associated with a first product, wherein the one or more multi-modal user inputs are at least speech, text, bodily expressions and clickstream data. The product recommendation system determines an intent-score for each of the one or more multi-modal user inputs using one or more trained data models. The product recommendation system computes an emotion-score by aggregating the intent-score for each of the one or more multi-modal user inputs based on a weighted average of the intent-score for each of the one or more multi-modal user inputs. The product recommendation system recommends one or more second products based on the emotion-score.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 4 illustrates a block diagram of an exemplary computer system for implementing embodiments consistent with the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
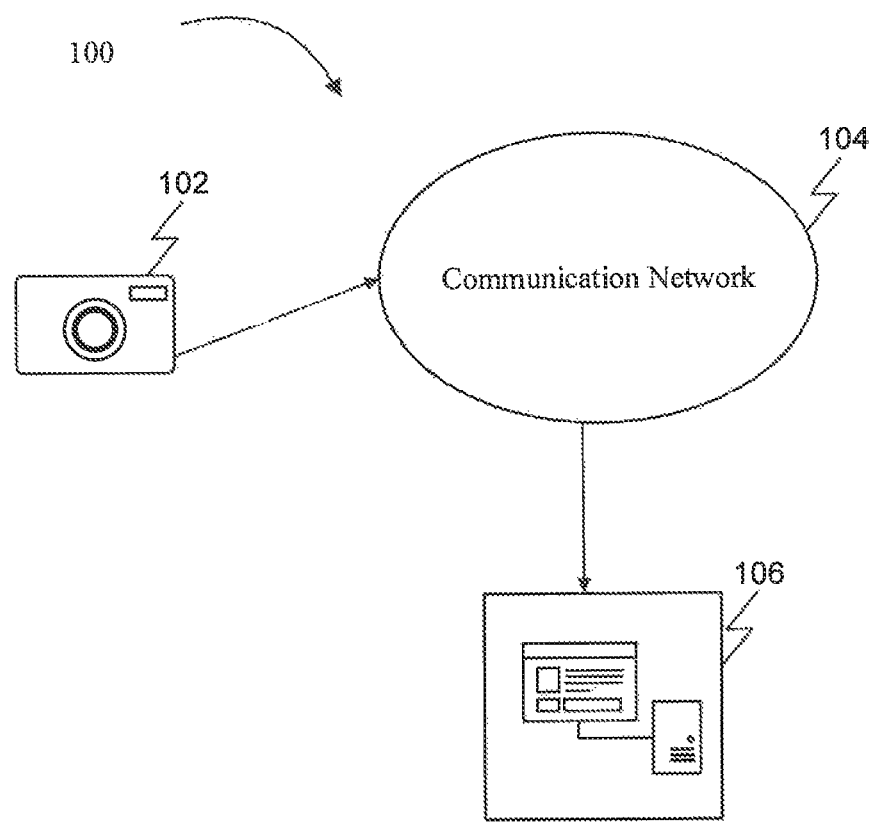
FIG. 1 illustrates a block diagram of an exemplary environment in which various embodiments of the present disclosure may function.

FIG. 1 is a block diagram that illustrates an exemplary environment 100 in which various embodiments of the present disclosure may function. The environment 100 may include a multi-modal input capturing device 102. In some embodiments, the multi-modal input capturing device 102 may capture inputs in modes of at least text, voice, facial, bodily expressions and clickstream data. The multi-modal input capturing device 102 after receiving the inputs in one or more modes may communicate through a communication network 104 with a product recommendation device 106. The communication network 104 although represented as one communication network in FIG. 1 may in reality correspond to different communication networks under different contexts. For example, the communication network 104 may include various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (TR), IEEE 802.11, 802.16, 2G, 3G, 4G cellular communication protocols, and/or Bluetooth (BT) communication protocols. The communication network 104 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an embodiment, the product recommendation device 106 may refer to a computing device that may be configured to receive at least, one or more multi-modal user inputs associated with a first product, wherein the one or more multi-modal user inputs are at least speech, text, bodily expressions and clickstream data. The product recommendation device 106 may include hardware and/or software that may be configured to perform one or more predetermined operations.

The product recommendation device 106 may refer to a computing device or a software framework hosting an application or a software service. The product recommendation device 106 may perform one or more operations through one or more units (explained in detail in FIG. 0.2). The one or more operations may include determining an intent-score for each of the one or more multi-modal user inputs using one or more trained data models, computing an emotion-score by aggregating the intent-score for each of the one or more multi-modal user inputs based on a weighted average of the intent-score for each of the one or more multi-modal user inputs, and recommending, by the product recommendation device, one or more second products based on the emotion-score.

In an embodiment, the product recommendation device 106 may be implemented to execute procedures such as, but not limited to, programs, routines, or scripts stored in one or more memories for supporting the hosted application or the software service. In an embodiment, the hosted application or the software service may be configured to perform one or more predetermined operations. The product recommendation device 106 may be realized through various types of servers such as, but are not limited to, a Java application server, a .NET framework application server, a Base4 application server, a PHP framework application server, or any other application server framework.

Figure 2:
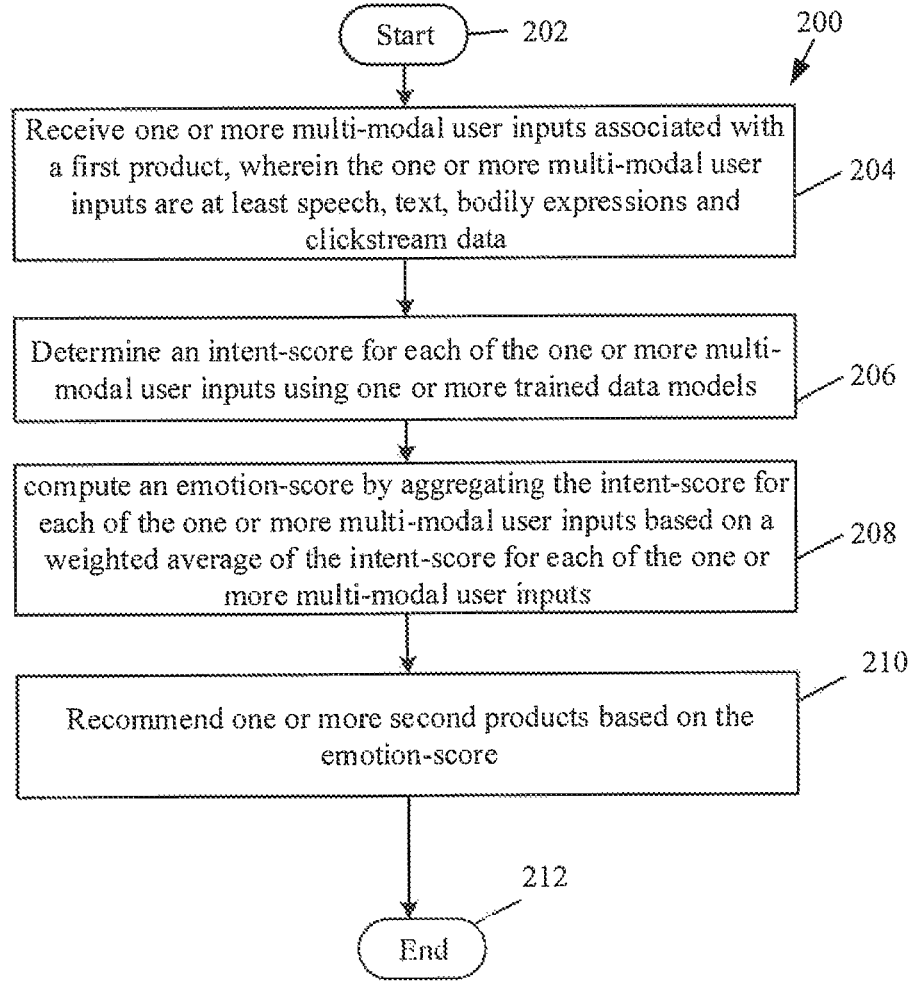
FIG. 2 is a flowchart illustrating a method for product recommendation by fusing one or multi-modal user inputs, in accordance with some embodiments of the present disclosure.

FIG. 2 is a method flow describing a multi-modal input based machine learning platform for intent based product recommendations. The method starts at 202. The method at 204 includes receiving, by a product recommendation device, one or more multi-modal user inputs associated with a first product. Here, the one or more multi-modal user inputs may include speech, text, bodily expressions and clickstream data. There may be one or more interfaces to receive the one or more multi-modal inputs. These interfaces are embedded in multi-modal input modules 314. The multi-modal input modules 314 may include at least a natural language processing module, a text module and a convolution neural network module (not shown in FIG. 2). In an embodiment, the natural language processing module may be configured to receive user speech utterances in one or more languages. The natural language processing model (hereafter NLP model), may be trained to detect the one or more data in different languages and convert to a machine readable language, through which the user may converse. For example, a user may enter data with the product recommendation device 106 in languages like English, German, Bengali, Kannada and more. The text model may be configured to receive textual inputs from the user. The textual data are processed and the data is labelled to be matched with a dictionary of words with which the text model is trained. The one or more words in the dictionary has been given a score each to indicate the intent of the user. For example, a textual word of "very happy" or "very interesting" may have a pre-assigned score of 10. The convolution neural network model (hereafter CNN model) is configured to detect bodily expressions. The CNN model is pre-trained to detect the said bodily expressions. For example, the said bodily expressions may be head nods, head rotation, eye ball tracking, pupil dilation, facial muscular expressions, limb movements and age of the user. To a further extent the CNN module can also track and interpret deaf and dumb language for differently abled persons. The natural language processing module, the text module and the CNN module is further explained in conjunction with FIG. 3.

Once the multimodal inputs are received, the score aggregator module 312 at step 206 determines an intent-score for each of the one or more multi-modal user inputs using one or more trained data models. For example, the NLP model may rank the inputs as the way it is trained to. Similarly, the scores assigned to textual inputs and the bodily expressions are respectively noted. Once the one or more intent-scores are received for the one or more multimodal inputs, the score aggregator module 312 at step 208 computes an emotion-score by aggregating the intent-score for each of the one or more multi-modal user inputs based on a weighted average of the intent-score for each of the one or more multi-modal user inputs. A weightage is pre-assigned to the one or more multimodal user inputs. For example, the NLP inputs can be assigned a higher weightage than the speech to textual inputs, which is in turn more than the bodily expression inputs. For example, weightage to NLP input, text input and CNN input (bodily expressions) may be 10, 5 and 2.5 respectively. In the exemplary embodiment, let $(\underline{x})=f(x_1, x_2, \ldots, x_n)=p_1$ where $\underline{x}=(x_1, x_2, \ldots, x_n)$ are the features associated with the one or more NLP inputs and $p_1$ is the probable outcome of the NLP input intent, for speech to textual inputs let $g(\underline{y})=g(y_1, y_2, \ldots, y_n)=p_2$ where $\underline{y}=(y_1, y_2, \ldots, y_n)$ are the features associated with the speech to textual data and $p_2$ is the probable outcome of the one or more speech to textual inputs and Let $h(\underline{z})=h(z_1, z_2, \ldots, z_n)=p_3$ where $\underline{z}=(z_1, z_2, \ldots, z_n)$ are the one or more inputs for bodily expressions and $p_3$ is the probable outcome of the one or more bodily expression inputs. Once the probable outcome (the intent-scores) for the one or more multimodal inputs are obtained, the weightages $w_1$, $w_2$ and $w_3$ are respectively applied to $p_1$, $p_2$ and $p_3$. And weightages $w_1$, $w_2$ and $w_3$ are respectively pre-assigned to NLP inputs, textual inputs. The score aggregator module 312 fuses the one or more multimodal inputs by aggregating the intent-scores $p_1$, $p_2$ and $p_3$. along with their respective weightages $w_1$, $w_2$ and $w_3$. The following equation illustrates the aggregation:

$$w_1 \geq w_2 \geq w_3 \text{ and } w_1+w_2+w_3=1$$

$$K=w_1p_1+w_2p_2+w_3p_3;$$

if $K \geq K_0$; then it will be state 1;
$K_0 \leq K \leq K_1$; then it will be state 2; and
$K < K_0$; then it will be state 3. AND $K_0$, $K_1$ are the pre-defined threshold values.
Here in the above situation, state 1, state 2 and state 3 in an exemplary embodiment may denote three states of emotion—happy, neutral and sad. $K_0$, K and $K_1$ are three different thresholds for the three different emotions respectively, as explained. It denotes the emotion score after aggregation.

Once the aggregate is computed, the aggregate emotion score is sent to the recommendation engine 316. The recommendation engine 316 at step 210 recommends one or more second products based on the emotion-score.

In another embodiment, the clickstream data as one of the input mode may influence in recommendation of one or more products. For example, if the threshold yields to be $K_1$ which is below the optimum threshold, there is a probability that the product recommendation may not be accurate. In an embodiment, the clickstream data may then be analyzed to recommend product to the user which is of interest. The clickstream data may further be analyzed for future product recommendations.

Figure 3:
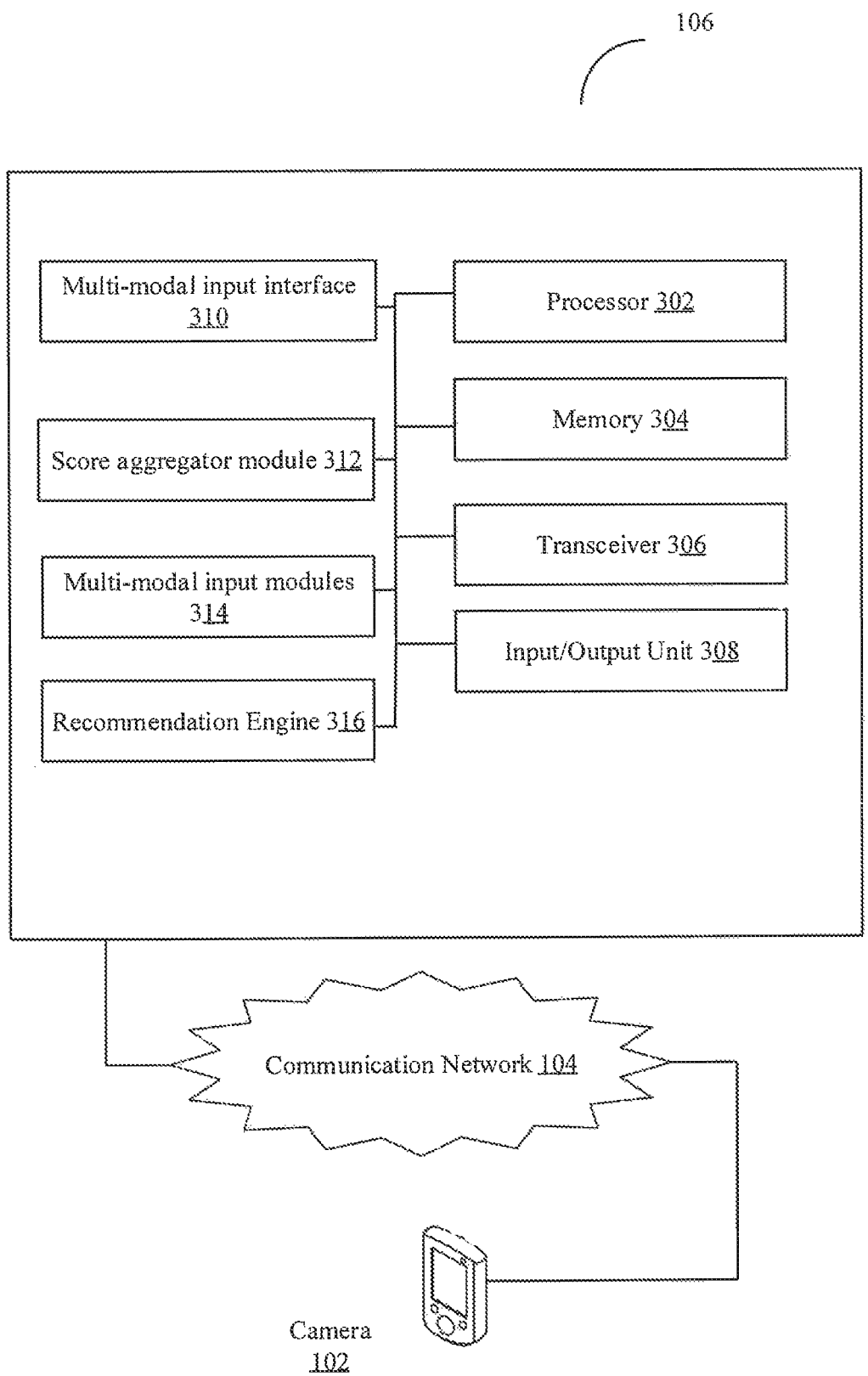
FIG. 3 illustrates a block diagram of a product recommendation device, in accordance with some embodiments of the present disclosure.

FIG. 3 illustrates a block diagram, in accordance with some embodiments of the present disclosure, a product recommendation device 106, configured for recommending products based on the one or more input models received via a machine learning platform. The product recommendation device 106 may include a processor 202, a memory 204, a transceiver 206, and an input/output unit 208. The product recommendation device 106 may further include a multi-modal input interface 210, a score aggregator module 312, a multi-modal input module 314 and a recommendation engine 316.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. In an embodiment, the other modules 223 may be used to perform various miscellaneous functionalities of the activity automation system 105. It will be appreciated that such modules may be represented as a single module or a combination of different modules. Furthermore, a person of ordinary skill in the art will appreciate that in an implementation, the one or more modules may be stored in the memory 205, without limiting the scope of the disclosure. The said modules when configured with the functionality defined in the present disclosure will result in a novel hardware.

The multi-modal input module 314 is a training engine behind the NLP model, the speech to text model and the CNN model. Generating a trained NLP model may include feeding data comprising of languages, and speech and its relating corresponding parameters of acoustics. The NLP model may be trained to recognize various languages. The NLP can be trained to analyze acoustic parameters of speech, namely zero crossing rate, energy, entropy of energy, spectral speed, spectral flux, spectral entropy. The analysis of these acoustic parameters associated with speech is augmented by a SVM (speech vector machine) classifier. For example, zero crossing rate is a parameter for voiced or unvoiced classification. In the embodiment it may be used as a part of the front-end processing in automatic speech recognition system. The zero crossing count is an indicator of the frequency at which the energy is concentrated in the signal spectrum. Entropy of energy may be used to recognize speech in a noisy environment. The parameter of spectral speed and spectral flux in speech processing are employed to enhance a speech signal. For example, the user may have a vocal which may be at times, loud or feeble, high or low pitched, in an environment which may be noisy. The SVM classifier (in NLP model) is configured to extract the mentioned features of speech.

The speech to text model may be trained to determine vocal speech of the user. The speech to text model is trained with a dictionary of words and phrases, where every signifies its own characteristics corresponding the user emotion. For example, words like "great", "This is perfect", "a very good product", "I am going to buy" etc, indicate state of extreme happiness as an emotion. Whereas, words like "not interested", "not so cool", "disgusting" implies negative emotion towards a product recommended.

The CNN model may be trained to determine one or more bodily expressions. The one or more bodily expressions may include at least one of hand gestures, eye movements, facial expressions, and head rotation, and age. For example, a nodding of a head from left to right may indicate disinterest and nodding of a head up and down may indicate interest. A hand movement is a particular way may indicate interest or disinterest. The CNN model can be further trained to detect facial muscular movements, eye ball rotation and dilation of pupils all of which may indicate interest and emotional response of the user.

In an embodiment the multi-modal input interface 202 may be used to receive one or more multimodal inputs from users who are differently enabled. For example, the multi-modal input interface 202 can receive one or more inputs from a blind, deaf or a dumb person. The score aggregator module 312 may be then configured to switch to a mode where the weightages assigned to the models may change as per the needs of the user. For example, for a blind person, the multi-modal input interface 202 may accept voice and bodily expressions as input. In this case, the score aggregator module 312 in the case of a blind person, may switch to a mode when the weightage for NLP input is taken as zero and speech is given the next highest weightage followed by bodily expressions. As earlier stated in the example for weightages, $w_1$ (NLP) which had a pre-assigned weightage of 10 will take zero for a blind person and $w_2$ (text) will take 10 and $w_3$ (CNN) will take the weightage of 5. In case of a dumb person $w_1$ may be assigned 2.5 and $w_3$ for bodily expression will take the weightage of 10 and $w_2$ for text may take a highest weightage of 10. The multi-modal input interface 210 may have at least a touchscreen, inputs to receive text, voice recognition sensors, camera, and microphone.

The processor 202 may include suitable logic, circuitry, interfaces, and/or code that may be configured to execute a set of instructions stored in the memory 204. The processor 202 may be implemented based on a number of processor technologies known in the art. Examples other processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 may include suitable logic, circuitry, interfaces, and/or code that may be configured to store the set of instructions, which may be executed by the processor 202 for recommending products to the user. For example, the memory may store information on weightages to models, intent-scores to be assigned to the one or more inputs of various levels for NLP, text and bodily expressions. In an embodiment, the memory 204 may be configured to store one or more programs, routines, or scripts that may be executed in coordination with the processor 202. The memory 204 may be implemented based on a Random Access Memory (RAM), a Read-Only Memory (ROM), a Hard Disk Drive (HDD), a storage server, and/or a Secure Digital (SD) card.

The transceiver 206 may receive one or more multi-modal user inputs associated with a first product, wherein the one or more multi-modal user inputs are at least speech, text, bodily expressions and clickstream data. The transceiver 206 may implement one or more known technologies to support wired or wireless communication with the communication network 104. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.1 in), voice over Internet Protocol (VoIP), Wi-MAX, a protocol for email, instant messaging, and/or Short Message Service (SMS).

The product recommendation device 106 may further include an Input/Output (I/O) unit 208. The Input/Output (I/O) unit 208 may include suitable logic, circuitry, interfaces, and/or code that may be configured to receive an input or transmit an output. The input/output unit 208 may include various input and output devices that are configured to communicate with the processor 202. Examples of the input devices include, but are not limited to, a keyboard, a mouse, a joystick, a touch screen, a microphone, and/or a docking station. Examples of the output devices include, but are not limited to, a display screen and/or a speaker.

Computer System

FIG. 4 illustrates a block diagram of an exemplary computer system for implementing embodiments consistent with the present disclosure. Variations of computer system 401 may be used for recommending products by analyzing multimodal inputs of the user. The computer system 401 may comprise a central processing unit ("CPU" or "processor") 402. Processor 402 may comprise at least one data processor for executing program components for executing user or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon™, Duron or Opteron, ARM's application, embedded or secure processors, IBM PowerPC®, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 703 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone™, Smart TV, Android-based phones, etc.), tablet computers, eBook readers (Amazon Kindle, Nook, etc.), laptop computers, notebooks, gaming consoles (Microsoft Xbox™, Nintendo DS™, Sony PlayStation™, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, UNIX, Unix-like system distributions (e.g., Berkeley Software Distribution™ (BSD), FreeBSD, NetBSD, OpenBSD, etc.), Linux distributions (e.g., Red Hat™, Ubuntu™, Kubuntu™, etc.), IBM OS/2™, Microsoft Windows™ (XP, Vista/7/8, etc.), Apple iOS®, Google Android™, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero™, Metro™, etc.), Unix X-Windows, web interface libraries (e.g., ActiveX™, Java™, Javascript™, AJAX™, HTML, Adobe Flash™, etc.), or the like.

In some embodiments, the computer system 401 may implement a web browser 418 stored program component. The web browser may be a hypertext viewing application, such as Microsoft™ Internet Explorer™, Google Chrome™, Mozilla Firefox™, Apple Safari™, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 701 may implement a mail server 719 stored program component. The mail server may be an Internet mail server such as Microsoft Exchange™, or the like. The mail server may utilize facilities such as ASP, ActiveX, ANSI C++/C#, Microsoft .NET™, CGI scripts, Java™, JavaScript™, PERL™, PHP™, Python™, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail™, Microsoft Entourage™, Microsoft Outlook™, Mozilla Thunderbird™, etc.

In some embodiments, computer system 401 may store user/application data 421, such as the data, variables, records, etc. as described in this disclosure. Such databases may be implemented as fault-tolerant, relational, scalable, secure databases such as Oracle™ or Sybase™. Alternatively, such databases may be implemented using standardized data structures, such as an array, hash, linked list, struct, structured text file (e.g., XML), table, or as object-oriented databases. Such databases may be consolidated or distributed, sometimes among the various computer systems discussed above in this disclosure. It is to be understood that the structure and operation of the any computer or database component may be combined, consolidated, or distributed in any working combination.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention. Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

ADVANTAGES OF THIS INVENTION

The invention uses a multimodal approach. It receives one or more user inputs in various modes, combines them to get a fused result indicative of the intent and emotion of the user. It is a very dynamic approach of gathering various user actions, intent, sentiment and other behavior. Furthermore, the system can still recommend, using clickstream data, if the user is not happy with the products recommended after combining the multimodal inputs.

We claim:

1. A method for user-intent based product recommendations, the method comprising:
    receiving, by a product recommendation device, one or more multi-modal user inputs associated with a first product, wherein the one or more multi-modal user inputs are at least speech, text, bodily expressions and clickstream data;
    determining, by the product recommendation device, an intent-score for each of the one or more multi-modal user inputs using one or more trained data models, wherein the intent-score associated with the one or more multi-modal inputs is further adjusted dynamically based on the clickstream data of the user;
    computing, by the product recommendation device, an emotion-score by aggregating the intent-score for each of the one or more multi-modal user inputs based on a weighted average of the intent-score for each of the one or more multi-modal user inputs; and
    recommending, by the product recommendation device, one or more second products based on the emotion-score.

2. The method of claim 1, wherein the one or more trained data models comprises a natural language processing model, a text model, and a convolution neural network model.

3. The method of claim 2, wherein the natural language processing model, the speech to text model, and the convolution neural network model determines the intent-score for text, the intent-score for speech and the intent-score for bodily expressions respectively.

4. The method as claimed in claim 1, wherein the bodily expressions comprise at least one of hand gestures, eye movements, facial expressions, and head rotation, and age.

5. The method of claim 1, wherein the intent-scores adjusted are determined into a preconfigured range based on the clickstream data of the user.

6. A product recommendation device for recommending products to a user comprising:
    a processor; and
    a memory communicatively coupled to the processor, wherein the memory stores processor executable instructions, which on execution causes the processor to:
    receive one or more multi-modal user inputs associated with a first product, wherein the one or more multi-modal user inputs are at least speech, text, bodily expressions and clickstream data;
    determine an intent-score for each of the one or more multi-modal user inputs using one or more trained data models, wherein the intent-score associated with the one or more multi-modal inputs is further adjusted dynamically based on the clickstream data of the user;
    compute an emotion-score by aggregating the intent-score for each of the one or more multi-modal user inputs based on a weighted average of the intent-score for each of the one or more multi-modal user inputs;
    recommending, by the product recommendation device, one or more second products based on the emotion-score.

7. The product recommendation device of claim 6, wherein the one or more trained data models comprises a natural language processing model, a speech to text model, and a convolution neural network model.

8. The product recommendation device of claim 7, wherein the natural language processing model, the speech to text model, and the convolution neural network model determines the intent-score for text, the intent-score for speech to text and the intent-score for bodily expressions respectively.

9. The product recommendation device of claim 6, wherein the bodily expressions comprise at least one of hand gestures, eye movements, facial expressions, and head rotation, and age.

10. The product recommendation device of claim 6, wherein the intent-scores adjusted are determined into a preconfigured range based on the clickstream data of the user.

* * * * *